United States Patent
Kondareddy et al.

(10) Patent No.: US 11,611,969 B2
(45) Date of Patent: Mar. 21, 2023

(54) DYNAMICALLY SWITCHING BETWEEN SHARED AND TIME DIVISION MULTIPLEXED ACCESS TO WIRELESS MEDIA BASED ON CHANNEL QUALITY

(71) Applicant: Cypress Semiconductor Corporation, San Jose, CA (US)

(72) Inventors: Raghunatha Kondareddy, Fremont, CA (US); Ateet Kapur, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 120 days.

(21) Appl. No.: 17/031,624

(22) Filed: Sep. 24, 2020

(65) Prior Publication Data

US 2022/0095311 A1     Mar. 24, 2022

(51) Int. Cl.
*H04W 72/08* (2009.01)
*H04W 72/04* (2009.01)
*H04W 4/80* (2018.01)
*H04W 84/12* (2009.01)
*H04W 72/0446* (2023.01)

(52) U.S. Cl.
CPC ..... *H04W 72/085* (2013.01); *H04W 72/0446* (2013.01); *H04W 4/80* (2018.02); *H04W 84/12* (2013.01)

(58) Field of Classification Search
None
See application file for complete search history.

(56) References Cited

U.S. PATENT DOCUMENTS

| | | | |
|---|---|---|---|
| 2008/0192806 A1* | 8/2008 | Wyper | H04J 3/1694 375/E1.033 |
| 2010/0210223 A1* | 8/2010 | Gorbachov | H04B 1/0057 455/552.1 |
| 2013/0010830 A1* | 1/2013 | Hori | H04W 16/14 375/E1.033 |
| 2014/0341108 A1* | 11/2014 | Desai | H04J 11/0056 370/328 |
| 2016/0095142 A1* | 3/2016 | Chu | H04L 1/00 370/329 |
| 2016/0119914 A1* | 4/2016 | Oizumi | H04W 16/14 370/329 |

(Continued)

OTHER PUBLICATIONS

Chiasserini et al., "Coexistence Mechanisms for Interference Mitigation in the 2.4-GHz ISM band", IEEE transactions on wireless communications, vol. 2, No. 5, Sep. 2003. (Year: 2003).*

*Primary Examiner* — Faruk Hamza
*Assistant Examiner* — Cassandra L Decker (57) ABSTRACT

A device can have collocated communication circuits and operate in a parallel mode if selected first wireless channels are above a certain quality, and operate in a time division (TD) mode if the selected first wireless channels are below a certain quality. The parallel mode can include using first channels for a first protocol that do not overlap a second channel used by a second protocol. The TD mode can include first time periods in which a first protocol uses first channels that overlap the second channel, while the second protocol is inactive, and second time periods, in which the first protocol is inactive and the second protocol is active.

16 Claims, 8 Drawing Sheets

(56) References Cited

U.S. PATENT DOCUMENTS

| | | | | |
|---|---|---|---|---|
| 2016/0381572 A1* | 12/2016 | Shahar | .................... | H04W 4/80 |
| | | | | 455/41.2 |
| 2017/0134882 A1* | 5/2017 | Kao | .................. | H04W 72/1215 |
| 2020/0358544 A1* | 11/2020 | Huang | ................ | H04W 72/044 |
| 2021/0204141 A1* | 7/2021 | Nagarathnam | ... | H04W 72/0446 |

* cited by examiner

FIG. 11
(BACKGROUND)

DYNAMICALLY SWITCHING BETWEEN SHARED AND TIME DIVISION MULTIPLEXED ACCESS TO WIRELESS MEDIA BASED ON CHANNEL QUALITY

TECHNICAL FIELD

The present disclosure relates generally to wireless systems, and more particularly to wireless systems having collocated devices that can communicate according to different protocols that can share a wireless medium.

BACKGROUND

Figure 11:
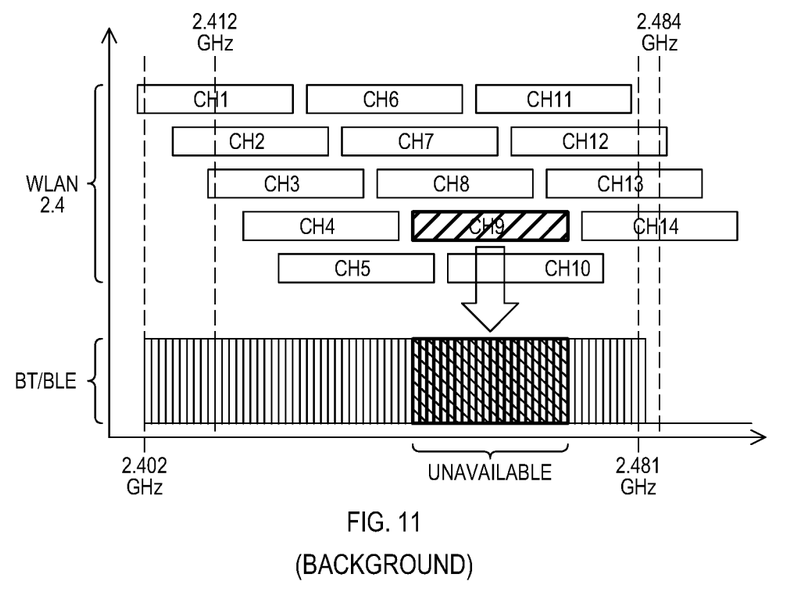
FIG. 11 is a diagram showing conventional use of a 2.4 GHz band by a conventional WLAN-BT combination device.

FIG. 11 is a diagram showing the allocation of bandwidth between different wireless circuits on a same device according to a conventional approach. One wireless circuit can operate according to a 2.4 GHz IEEE 802.11 standard (WLAN 2.4) while the other wireless circuit can operate according to a Bluetooth (BT) Standard and/or BT Low Energy Standard (BT/BLE). Such a device can be considered a BT/WLAN "coexistence" or combination device. WLAN 2.4 can operate on a number of different overlapping 22 MHz channels, shown as CH1 to CH14. CH1 at one end of the WLAN spectrum can have a center frequency of 2.412 GHz. CH14 at the other end of the WLAN spectrum can have a center frequency of 2.484 GHz.

BT/BLE circuits can adaptively frequency hop (AFH) between 2.402 GHz and 2.481 GHz on 1 MHz (BT) or 2 MHz (BLE) channels. Accordingly, WLAN channels CH1 to CH14 can overlap a portion of the BT/BLE channels. As a result, WLAN 2.4 channels can interfere with BT/BLE operations. In addition, BT/BLE circuits can monitor a quality of BT/BLE channels to avoid low quality channels. Thus, in conventional operations of a device having collocated BT/BLE and WLAN circuits, AFH operations by BT/BLE circuits will not use low quality BT/BLE channels or BT/BLE channels that overlap with the WLAN channel.

Having BT/BLE operations avoid BT/BLE channels that overlap an active WLAN channel can provide sufficient performance for a coexistence device provided the 2.4 GHz band is sufficiently free of other interference. However, very often this is not the case. In a crowded 2.4 GHz band, the number BT/BLE channels that do not overlap the WLAN channels can be used by other devices, and thus be of a low quality. As a result, the number of available non-overlapping BT/BLE channels can occasionally fall below a minimum number needed for AFH, leading to delayed BT/BLE operations.

It would be desirable to arrive at some way of improving the availability of transmission media for collocated devices that have overlapping transmission channels.

DETAILED DESCRIPTION

According to embodiments, systems and devices can operate according to different wireless protocols having overlapping bandwidths. First circuits operating according to the first protocol can frequency hop between multiple first channels, a number of which can overlap a larger second channel. Second circuits operating according to a second protocol can operate across the second channel. Operations can dynamically switch between first (e.g., parallel coexistence) and second (e.g., time division coexistence, TD) modes of operations.

In the first mode of operation, first circuits can avoid first channels that overlap the second channel when frequency hopping, while second circuits can use the second channel. In the second mode of operation, operations can be divided into first and second time slots. In first time slots, the second circuits can operate across the second channel, while first circuits do not operate on the first channels. In second time slots, the first circuits can use those first channels that overlap the second channel, and the second circuits do not operate across the second channel.

In some embodiments, first circuits can monitor a quality of first channels. If, in a first mode, a quality of the first channels falls below a predetermined level, the device can switch to the second mode. If, in the second mode, a quality of the first channels rises above a predetermined level, the device can switch to the first mode. In some embodiments, there can be a hysteresis in switching between modes based on quality levels.

In some embodiments, first circuits can be Bluetooth and/or Bluetooth low energy (BT/BLE) compatible circuits, and second circuits can include IEEE 802.11 wireless compatible circuits (e.g., WLAN) operating in the 2.4 GHz band.

In the various embodiments below, like items are referred to by the same reference characters, but with the leading digit(s) corresponding to the figure number. Unless noted otherwise, as used herein, the term "BT" is understood to include BLE.

Figure 1:
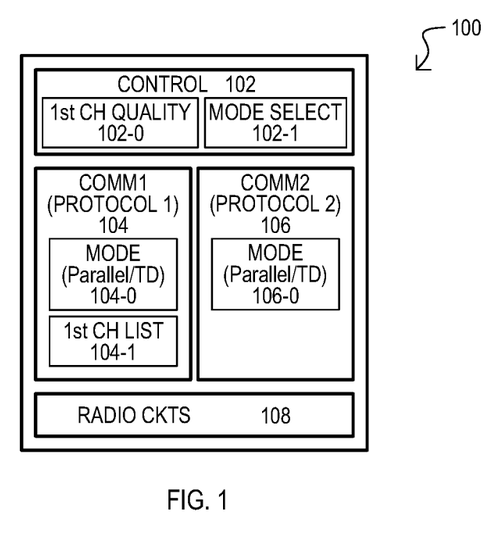
FIG. 1 is a block diagram of a combination device according to an embodiment.

FIG. 1 is a block diagram of a combination device 100 according to an embodiment. A device 100 can include different communication circuits collocated in the same device. A combination device 100 can include control circuits 102, first communication circuits 104, second communication circuits 106, and radio circuits 108. First communication circuits 104 can be wireless communication circuits compatible with a first protocol. First communication circuits 104 can include a mode control section 104-0 and a first channel list 104-1. A mode control section 104-0 can switch between a first (e.g., parallel coexistence) mode and a second (e.g., time division coexistence (TD)) mode. In a first mode, first communication circuits 104 can frequency hop among a set of first channels that does not include first channels that overlap with a second channel. In a second mode, first communication circuits 104 can be active in a time division fashion. In first time slots, first communication circuits 104 do not operate on the first channels. In second time slots, first communication circuits 104 can use first channels that overlap the second channel in frequency hopping operations. In some embodiments, first and second time slots can vary according to traffic. A first channel list 104-1 can maintain one or more lists of first channels to be used in frequency hopping operations.

Second communication circuits 106 can include a mode control section 106-0 that can switch between a first and second modes of operation. In a first mode, second communication circuits 106 can operate across a second channel. In a second mode, in first time slots, second communication circuits 106 can operate across the second channel. In second time slots, second communication circuits 105 do not operate on the second channel.

Control circuits 102 can include a first channel quality section 102-0 and a mode select section 102-1. First channel quality section 102-0 can monitor a quality of first channels. Such monitoring can include any suitable quality metric, including but not limited to, a packet error rate and/or error code checking (e.g., CRC). A mode select section 102-1 can dynamically switch between first and second modes of operation based on quality values for the first channels. In some embodiments, while a device 100 operates in a first mode, a mode select section 102-1 can monitor a quality of first channels used by first communication circuits 104. If such a quality falls below a predetermined level, a device 100 can be switched to the second mode of operation. While the device 100 operates in a second mode, a mode select section 102-1 can monitor a quality of first channels used by first communication circuits 104. If such a quality rises above a certain level, a device 100 can be switched back to the first mode of operation.

Radio circuits 108 can transmit data according to the first and second protocols. In particular embodiments, radio circuits 108 can enable the first and second communication circuits to share a common band (e.g., 2.4 GHz).

In particular embodiments, first communication circuits 104 can be BT/BLE compatible circuits and second communication circuits 106 can be IEEE 802.11 wireless compatible circuits.

In some embodiments, a device 100 can be a single integrated circuit device.

Figure 2A:
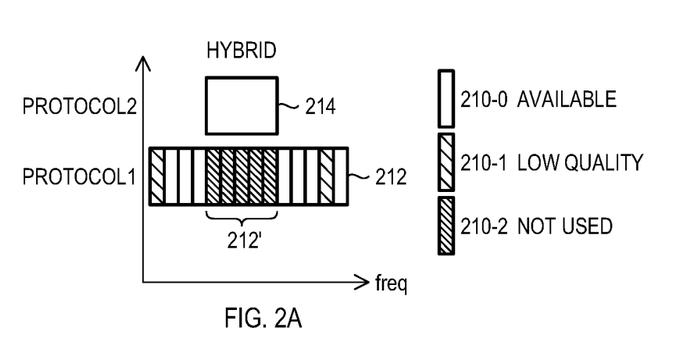
FIGS. 2A to 2C are diagrams showing band activity for a device like that of FIG. 1, according to embodiments.
Figure 2B:
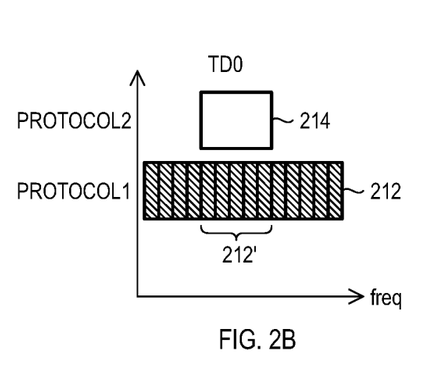
Figure 2C:
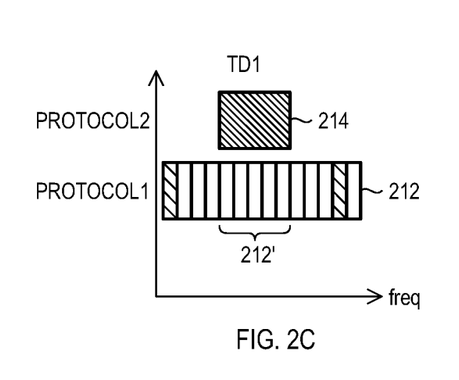

FIGS. 2A to 2C are diagrams showing operations of a coexistence device, like that shown in FIG. 1. FIGS. 2A to 2C show channels that are used by different protocols, and how an availability of the channels varies according to a mode of operation. FIGS. 2A to 2C show first channels 212 that may be available for a first protocol (PROTOCOL1) and a second channel 214 available to a second protocol (PROTOCOL2). Further, channels are indicated as being available 210-0 for a protocol (no hashing), as being of low quality 210-1 (sparse hashing) and so not used by a protocol, and as being inactive 210-2 (dense hashing) due to the mode of operation.

FIG. 2A shows operations in an "advanced parallel coexistence" (referred to herein as "parallel") mode. A second protocol can operate over second channel 214. A first protocol can operate over the first channels, excluding those first channels the overlap the second channel 212' and first channels of low quality.

FIG. 2B shows operations in a TD mode during a first time slot (TD0). A second protocol can operate over second channel 214. A first protocol will not operate on any of the first channels 212'.

FIG. 2C shows operations in a TD mode during a second time slot (TD1). A second protocol will not operate over the second channel 214. A first protocol can operate over the first channels, excluding first channels of low quality but including those first channels the overlap the second channel 212'.

Figure 3:
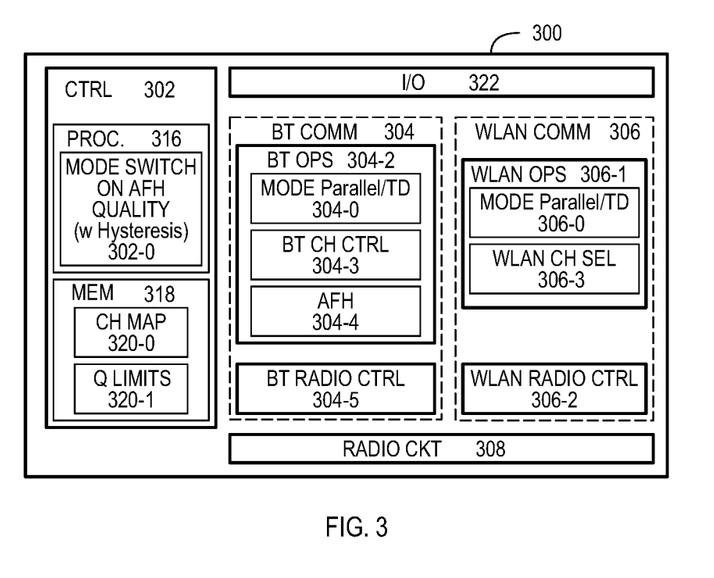
FIG. 3 is a block diagram of an IEEE 802.11 wireless (WLAN)-Bluetooth (BT/BLE) combination device according to an embodiment.

FIG. 3 is a block diagram of a combination device 300 according to another embodiment. In some embodiments, device 300 can be one implementation of that shown in FIG. 1. A combination device 300 can include controller circuits 302, BT communication circuits 304, WLAN communication circuits 306, radio circuits 308, and input/output (I/O) circuits 322.

BT communication circuits 304 can be circuits compatible with a BT standard, including BLE. BT communication circuits 304 can include a BT operations section 304-2 and BT radio control circuits 304-5. BT operations section 304-2 can include a mode control section 304-0, BT channel control section 304-3, and an adaptive frequency hopping (AFH) section 304-4. A mode control section 304-0 can operate BT communication circuits 304 in a parallel mode and a TD mode. In a parallel mode, BT communications can coexist with WLAN operations. However, BT channels that overlap the WLAN channel being used, are excluded from BT operations. In a TD mode, BT communications do not occur in a first time slot and do occur in a second time slot. Further, in the second time slot BT channels that overlap with the WLAN are included in BT operations. In some embodiments, first and second time slots can vary according to traffic and BT channel quality. That is, in a TD mode, a device 300 can dynamically switch between first and second time slots.

BT channel control section 304-3 can control which channels are used for AFH operations. In some embodiments, BT channel control section 304-3 can identify and indicate which BT channels overlap with a selected WLAN channel, and indicate such channels are not to be used in a parallel mode, but such channels can be indicated as available for use during the BT active time slot in a TD mode. AFH section 304-4 can execute AFH operations using available BT channels to communicate according to a BT standard. In some embodiments, AFH section 304-4 can also monitor a quality of each BT channel according to the BT standard, and generate BT quality values that indicate BT channel quality standards. BT radio control circuits 304-5 generate packets for transmission according to a BT standard, and process packets received according to a BT standard.

WLAN communication circuits 306 can operate according to one or more IEEE 802.11 wireless standards. WLAN communication circuits 306 can include WLAN operations section 306-1 and WLAN radio control circuits 306-2. WLAN operations section 306-1 can include a mode control section 306-0 and WLAN channel select section 306-3. A mode control section 306-0 can operate WLAN communication circuits 306 in a parallel mode and a TD mode. In a parallel mode, WLAN communications can occur over a selected WLAN channel and can coexist with BT operations. In a TD mode, WLAN communications can occur in a first time slot, but do not occur in a second time slot.

WLAN channel select section 306-3 can select a WLAN channel for operation from a number of possible overlapping WLAN channels in the 2.4 GHz band. In some embodiments, a WLAN channel can be selected dynamically, based on the operating environment. However, in other embodiments, a WLAN channel can be selected by configuration commands (e.g., a larger system or an operator). WLAN radio control circuits 306-2 generate packets for transmission according to a WLAN standard, and process packets received according to a WLAN standard.

Controller circuits 302 can control operations of a combination device 300, including switching between parallel and TD modes of operation. In some embodiments, controller circuits 302 can include a processor section 316 and associated memory section 318. A processor section 316 can include one or more processors that execute instructions for various operations. Such operations can include mode switching based on a quality of BT channels as determined by AFH section 304-4. In some embodiments, mode switching 302-0 can include monitoring the number of BT channels having a quality above a predetermined threshold, excluding those BT channels that overlap with a selected WLAN channel (i.e., non-overlapping BT channels). In a parallel mode, if the number of quality non-overlapping BT channels (i.e., BT channels have a quality above the threshold) falls below a limit, mode switching 302-0 can switch the device 300 to the TD mode, which can allow BT communication circuits 304 to use the overlapping BT channels in BT active timeslots. In a TD mode, if the number of quality non-overlapping BT channels rises above a limit, mode switching 302-0 can switch the device 300 to the parallel mode, which can prevent BT communication circuits 304 from using overlapping BT channels. In some embodiments, the switching limits can be different. Further, evaluation of BT channels can require multiple samples, resulting in hysteresis when switching between modes.

A memory section 318 can include any suitable memory circuit types, including nonvolatile and/or volatile memory. A memory section 318 can store any suitable data for the operation of the device 300, including instructions executable by processor section 316. In some embodiments, a memory section 316 can store a channel map 320-0. A channel map 320-0 can map WLAN channels to BT channels to identify overlapping BT channels based on a selected WLAN channel. A memory section 318 can also store limit values 320-1. Limit values 320-1 can include quality limit thresholds that control when a device 300 switches between parallel and TD modes. In the embodiment shown, controller circuits 302 can include a processor and memory section (316/318), however, any other suitable circuits could be employed, including application specific logic, both fixed or programmable.

Radio circuits 308 can include circuits for transmitting in at least the 2.4 GHz band according to a BT standard and one or more IEEE 802.11 standards.

I/O circuits 322 can enable control of combination device 300 from sources external to the combination device 300. I/O circuits 322 can include circuits that enable communication with the combination device 300 according to any suitable method. Such methods can include any of various serial data communication standards/methods including but not limited to: serial digital interface (SDI), universal serial bus (USB), universal asynchronous receiver transmitter (UART), I²C, or I²S.

While FIG. 3 shows a combination device that includes WLAN communication circuits and BT communication circuits, other embodiments can include any other suitable communication circuits. As but one example, a combination device can include communication circuits compatible with an IEEE 802.15.4 standard (i.e., Zigbee) collocated with WLAN communication circuits and/or BT communication circuits.

Figure 4:
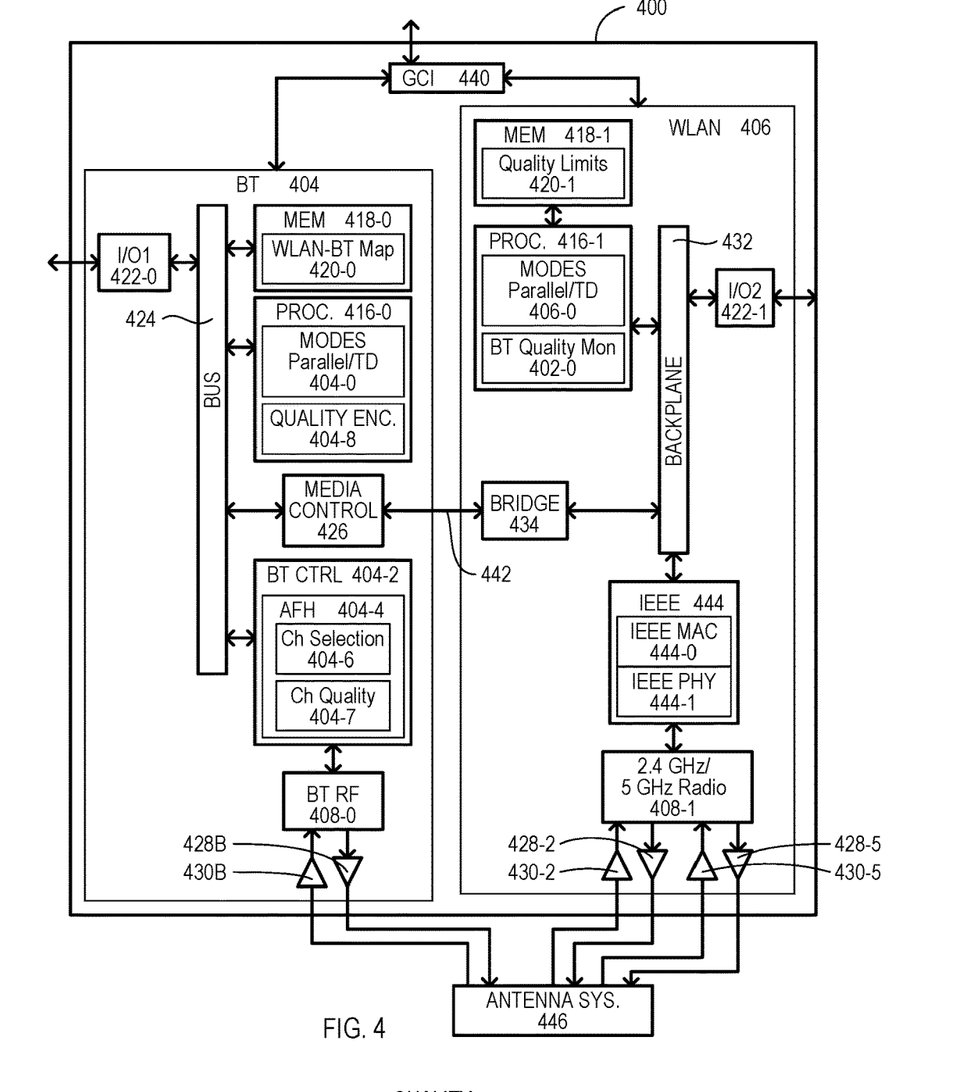
FIG. 4 is a block diagram of a WLAN-BT/BLE combination device according to another embodiment.

FIG. 4 is a block diagram of a combination device 400 according to another embodiment. In some embodiments, combination device 400 can be an implementation of either of those shown in FIG. 1 or 3. A combination device 400 can include a BT section 404 and a WLAN section 406. A BT section 404 can include a processor section 416-0, a memory section 418-0, BT control circuits 404-2, media control circuit 426, first I/O circuits 422-0, and BT RF circuits 408-0. A processor section 416-0 can execute instructions for BT operations, including switching between parallel and TD modes 404-0 as described herein or equivalents. In some embodiments, a processor section 416-0 can include encoding and transmitting quality values 404-8. Such an operation can encode the number of non-overlapping high-quality BT channels into a low-bit value for transmission to WLAN section 406, and optionally, as a value for output from the device 400. A low-bit value can be a value of no more than 8-bits, and preferably less than 8-bits. A memory section 418-0 can store data for BT operations, including instructions executable by processor section 416-0 as well as WLAN to BT channel mapping 420-0 to enable the determination of overlapping BT channels for a given WLAN channel.

BT control circuits 404-2 can include circuits for performing functions according to one or more BT standards, including an AFH section 404-4, which include BT channel selection 404-6 and BT channel quality 404-7 determination. BT channel selection 404-4 can select BT channels for AFH. Such a BT AFH channel list will vary according to mode, with a parallel AFH set excluding overlapping BT channels, and a TD AFH set including overlapping BT channels. BT channel quality 404-7 can monitor BT channels and generate quality values as described herein, or an equivalent.

BT RF circuits 408-0 can be controlled by BT control circuits and can include radio circuits to enable transmission of packets according to one or more BT standards. In the embodiment shown, BT RF circuits 408-0 can drive a BT power amplifier (PA) 428B and receive input signals from a BT low noise amplifier (LNA) 430B.

Media control circuits 426 can communicate with WLAN section 406 over bridge 442 to control access to transmission media (e.g., 2.4 GHz band). First I/O circuits 422-0 can enable communication with the combination device 400 according to any of the embodiments described herein or equivalents.

Processor section 416-0, memory section 418-0, BT control circuits 404-2, media control circuit 426, and first I/O circuits 422-0 can communicate over a bus 424.

A WLAN section 406 can include a processor section 416-1, a memory section 418-1, second I/O circuits 422-1, IEEE 802.11 circuits 444, bridge control circuit 434, and radio circuits 408-1. A processor section 416-1 can execute instructions for WLAN operations, including switching between parallel and TD modes 406-0 and determining BT channel quality 402-0. Switching between parallel and TD modes 406-0 can include varying modes of operation as described herein and equivalents. In some embodiments, determining BT channel quality 402-0 can include receiving a low-bit encoded quality value from BT section 404, and comparing such a value to one or more limits. A memory section 418-1 can store data for WLAN operations, and can also include data for mode switching operations, including quality limit values 420-1 (i.e., limits to which a low-bit encoded quality value can be compared).

Second I/O circuits 422-1 can enable communication with the combination device 400 according to any of the embodiments described herein or equivalents, including communications with a BT section 404 over bridge 442. Bridge control circuit 434 can control communications between BT section 404 and WLAN section 406 over bridge 442.

IEEE 802.11 circuits 444 can include circuits for performing functions according to one or more IEEE 802.11 wireless standards, including those operating in the 2.4 GHz band. In some embodiments, this can include IEEE 802.11 compatible media access control (MAC) layer circuits 444-0 and IEEE 802.11 compatible physical interface layer (PHY) circuits 444-1.

Radio circuits 408-1 can include multi-band radio circuits that transmit and receive data on one or more WLAN bands (e.g., 2.4 GHz, 5 GHz). In the embodiment shown, radio circuits 408-1 can drive a 2.4 GHz band PA 428-2, a 5 GHz band PA 428-5, and receive input signals from a 2.4 GHz LNA 430-2 and a 5 GHz LNA 430-5.

A combination device 400 can also include a global coexistence interface (GCI) 440 connected to both BT section 404 and WLAN section 406. In some embodiments, GCI can enable a combination device to interface with other wireless systems, such as cellular network systems, including but not limited to 3G, 4G, LTE and 5G networks. In some embodiments, operational values can be accessed via the GCI, including low-bit BT channel quality values.

Processor section 416-1, bridge control circuit 434, and IEEE 802.11 circuits 444 can be connected over a backplane 432.

A combination device 400 can connect to an antenna system 446. Antenna system 446 can include one or more physical antennas, as well as switches for enabling different connections to such antennas.

Figure 5:
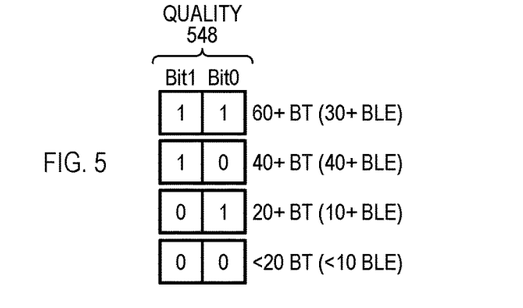
FIG. 5 is a diagram showing an encoded BT channel quality value according to an embodiment.

According to embodiments, quality values of non-overlapping BT channels can be encoded into a low-bit quality value for ease of transmission (from BT circuits to WLAN circuits) and/or evaluation (to predetermined quality limits). FIG. 5 shows a low-bit encoded quality value according to one embodiment. A quality value 548 can be a two-bit value, representing four quality ranges for standard BT operations or BLE operations. The quality ranges can represent how many non-overlapping BT channels are available (i.e., excluding both BT channels that overlap a selected WLAN channel, as well as non-overlapping channels having an error rate that exceeds a predetermined limit). A first range, corresponding to "00" can represent less than 20 available non-overlapping BT channels or less than 10 non-overlapping BLE channels. A second range, corresponding to "01" can represent more than 20 available non-overlapping BT channels or more than 10 non-overlapping BLE channels. A third range, corresponding to "10" can represent more than 40 available non-overlapping BT channels or more than 20 non-overlapping BLE channels. A fourth range, corresponding to "11" can represent more than 60 available non-overlapping BT channels or more than 30 non-overlapping BLE channels.

The ranges and encoding of FIG. 5 show one of many possible arrangements and should not be construed as limiting. An encoded quality value could be as small as one-bit, or greater than two bits.

FIGS. 6A to 6D are diagrams showing use of a 2.4 GHz band in different modes of operation according to embodiments. FIGS. 6A to 6D show a WLAN band as well as BT/BLE bands. While FIGS. 6A to 6D show one WLAN channel (CH9), it is understood a different WLAN channel covering a different portion of the band could be used. Further, a WLAN channel can vary dynamically, in which case the set of overlapping BT channels would change accordingly.

Figure 6A:
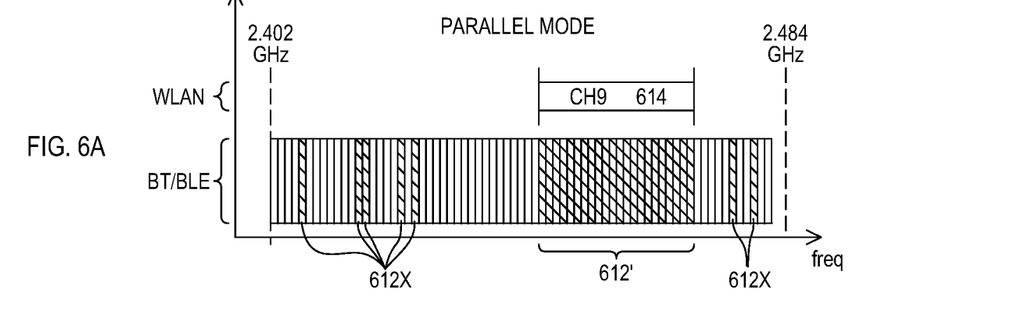
FIGS. 6A to 6D are diagrams showing band operations of a WLAN-BT/BLE combination device according to embodiments.

FIG. 6A shows an operation in a parallel mode. A WLAN channel 614 can be used by WLAN circuits. BT channels can include overlapping channels 612' and low-quality channels 612X, both of which can be excluded in AFH operations.

Figure 6B:
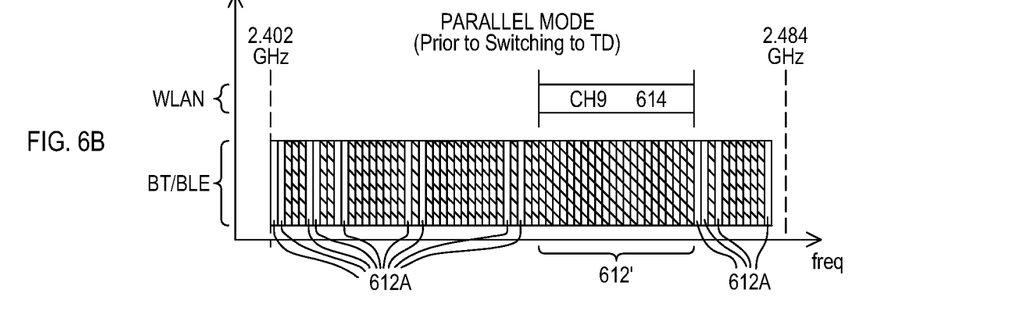

FIG. 6B shows an operation in a parallel mode just prior to switching to a TD mode. A WLAN channel 614 can continue to be used by WLAN circuits. However, in contrast to FIG. 6A, the number of low-quality BT channels has substantially increased resulting in the number of available BT channels 612A dropping below a predetermined threshold. In some embodiments, such a threshold can be less than 20 channels for standard BT, and less than 10 channels for BLE.

Figure 6C:
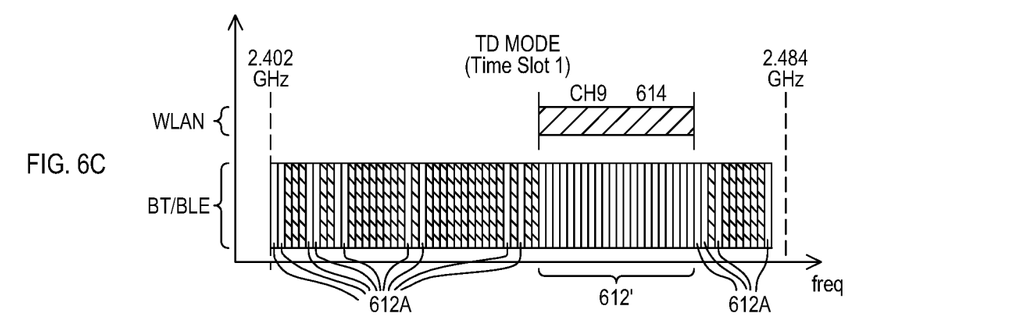

FIG. 6C shows an operation in a TD mode during one timeslot (time slot 1, or BT active time slot). A WLAN channel 614 can be inactive, as the channel is made unavailable for WLAN circuits. Overlapping BT channels 612', unavailable in the parallel mode, are now available, substantially increasing BT channels for AFH operations, as compared to FIG. 6B.

Figure 6D:
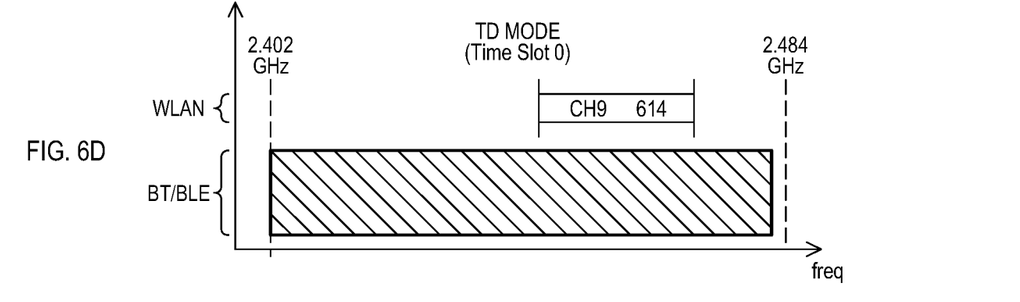

FIG. 6D shows an operation in TD mode during another timeslot (time slot 0, or WLAN active time slot). A WLAN channel 614 can be used by WLAN circuits. All BT channels can be unavailable for AFH operations. As noted herein, time slots can have dynamic durations, varying according to traffic and/or BT channel availability, as but two of many possible examples.

Figure 7:
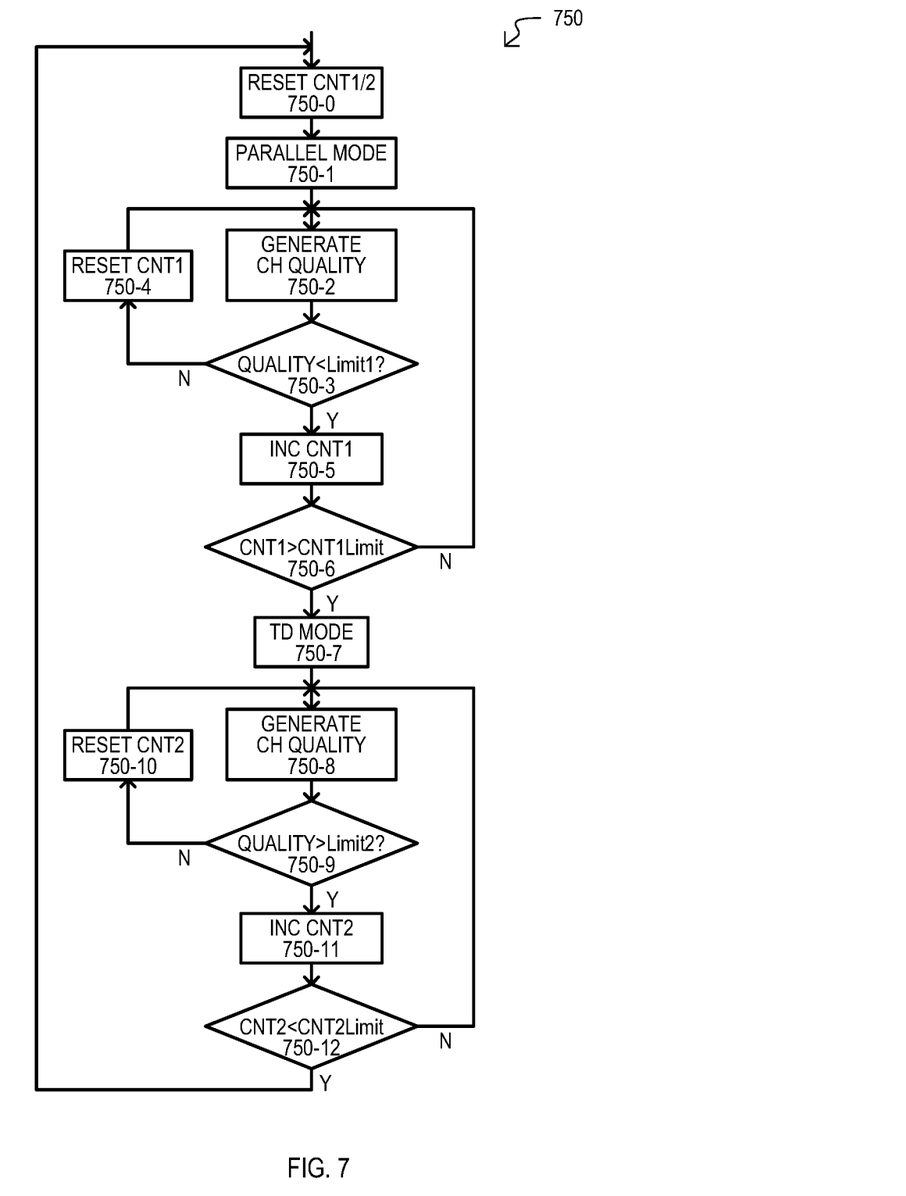
FIG. 7 is a flow diagram of a method of switching between parallel and time division (TD) modes of accessing a band according to an embodiment.

While the described devices and diagrams have disclosed various methods according to embodiments, additional methods will be described with reference to flow diagrams. FIG. 7 is a flow diagram of a method 750 according to an embodiment. In some embodiments, a method 750 is executable by a combination device, such as those described herein, or equivalents.

A method 750 can include resetting count values (CNT1/2) 750-0. Such an action can include resetting count values used to establish hysteresis in mode switching, as will be described in more detail. A method 750 can start in a parallel mode 750-1. In a parallel mode, a device can operate as described herein, or an equivalent, including wireless communications of a first protocol that frequency hop between first channels, and wireless communications of a second protocol over a second channel larger than the first channels, where the first channels do not overlap the second channel.

A method 750 can generate channel quality values 750-2. Such an action can include determining a quality value for a plurality of first channels that do not overlap a larger second channel. In some embodiments, this can include generating an encoded value as described herein, or an equivalent. A channel quality value can be compared to a first limit (Limit1) 750-3. Such an action can include determining if there are enough first channels to execute a desired frequency hopping algorithm. If a channel quality remains at a high enough level (N from 750-3), a method 750 can reset a count value (CNT1) 750-4 and return to generate another channel quality value 750-2.

If a channel quality falls below a limit (Y from 750-3), a method 750 can increment a count value (CNT1) 750-6. The count value can be compared to a count limit (CNT1≥Limit) 750-6. If a count value is below the count limit (N from 750-6), a method 750 can return to generate another channel quality value 750-2. If a count value is above the count limit (Y from 750-6), a method 750 can switch to a TD mode 750-7. In this way, if channel quality falls below a certain threshold for a predetermined amount of time (determined by the CNT1Limit), a device can switch from parallel mode to TD mode.

In a TD mode, a device can operate as described herein, or an equivalent. This can include, in first time slots, communications of the first protocol including first channels that overlap the second channel, while there are no communications of the second protocol. In second time slots there can be no communications of the first protocol while second protocol communications take place.

Also in the TD mode, a method 750 can generate channel quality values 750-8. A channel quality value can be compared to a second limit (Limit2) 750-9. If a channel quality remains at a low enough level (N from 750-9), a method 750 can reset a count value (CNT2) 750-10 and return to generate another channel quality value 750-8. If a count value is above the count limit (Y from 750-9), a method can increment the count value CNT2 750-11. The count value can be compared to a count limit (CNT2≤Limit) 750-12. If a count value is below the count limit (N from 750-12), a method 750 can return to generate another channel quality value 750-8. If a count value is above the count limit (Y from 750-12), a method 750 can return to 750-0, resetting count limit values and returning to the parallel mode 750-1.

Count values (CNT1/2) can introduce hysteresis into switching between parallel and TD modes. In some embodiments, the count values (CNT1/2) can be the same. However, in other embodiments count values (CNT1/2) can be different. In some embodiments, quality limit values (Limit1, Limit2) can be same (e.g., 25% of total first channels available). However, in other embodiments quality limit values can be different.

Figure 8:
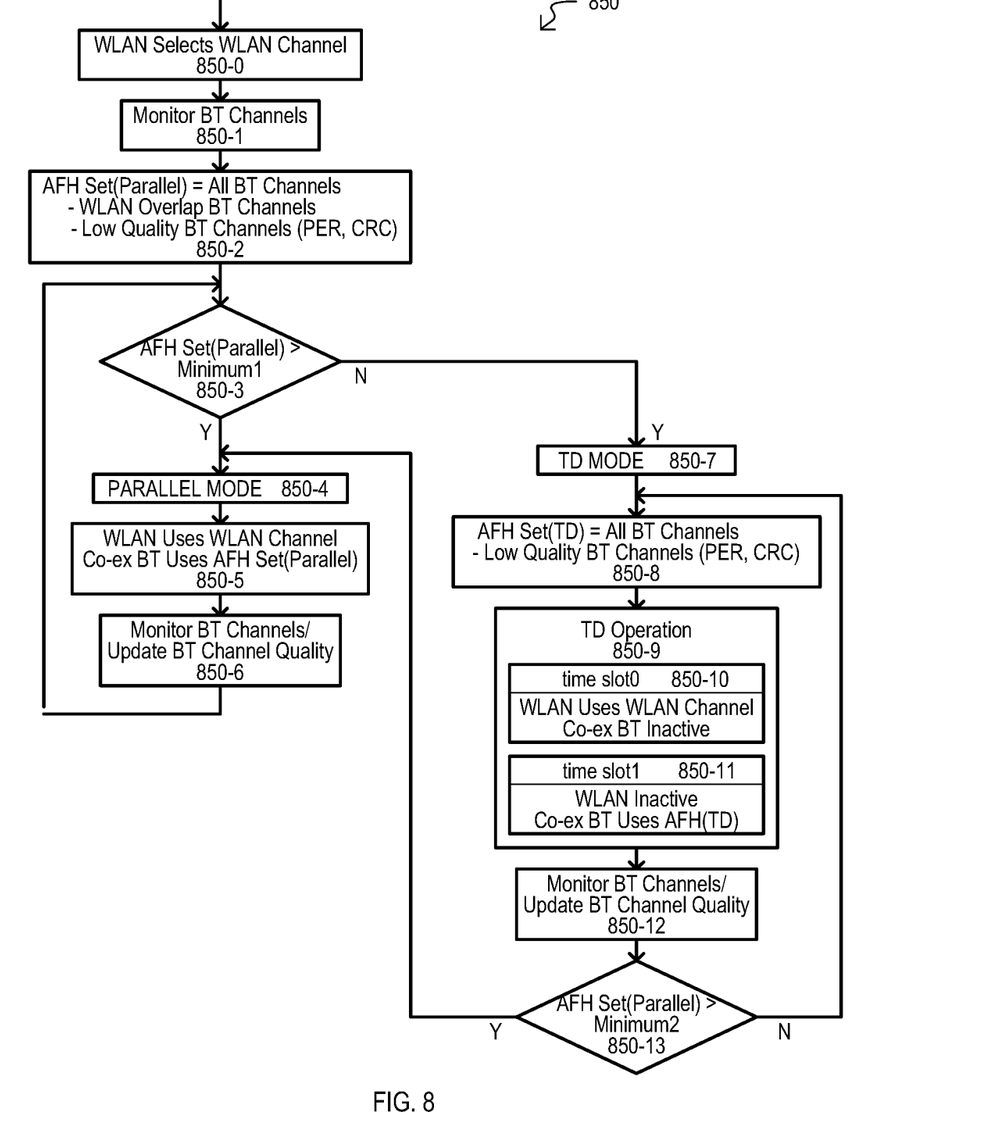
FIG. 8 is a flow diagram of a method of switching between parallel and time TD modes for a WLAN-BT/BLE combination device based on BT channel quality, according to embodiments.

FIG. 8 is a flow diagram of a method 850 according to another embodiment. A method 850 can include selecting a WLAN channel 850-0. Such an action can include a device selecting one of a number of WLAN channels in the 2.4 GHz band for WLAN communications. A method 850 can also include BT channels being monitored 850-1. Such an action can include BT circuits monitoring a quality of BT channels, and determining if any BT channels are low quality.

A method 850 can further include establishing an AFH set for parallel mode operations (AFH Set(Parallel)) that includes all BT channels minus both overlapping BT channels (i.e., BT channels that overlap the selected WLAN channel) and low quality BT channels 850-2. The parallel mode AFH set can be compared to a minimum value 850-3. A minimum value can be a minimum number of BT channels according to a standard and/or according to a quality/reliability requirement. In some embodiments, a quality value can be 20 BT channels (or 10 BLE channels). In some embodiments, such an action can include some hysteresis.

If a parallel mode AFH exceeds the limit (Y from 850-3), a device operates according to a parallel mode 850-4. In the parallel mode, WLAN circuits can use the selected WLAN channel and a coexisting BT circuit can use the parallel AFH set 850-5. A method 850 can continue to monitor a quality of BT channels, updating BT channel quality 850-6, and then return to evaluating a parallel AFH set 850-3 for quality once again.

If a parallel mode AFH falls below the limit (N from 850-3), a device can switch to the TD mode 850-7. In the TD mode, an AFH set can be updated. An AFH set for TD mode operations (AFH Set(TD)) can include all BT channels minus low quality BT channels 850-8 (i.e., it can include overlapping BT channels). In a TD mode, operations 850-9 can include operations during first time slots (time slot0) and second time slots (time slot1). In first time slots, WLAN circuits can use the WLAN channel for operations, while BT operations of a coexisting device can be inactive 850-10. In second time slots, operations on the WLAN channel can be inactive, while a coexisting BT circuit can use the TD AFH set 850-11. A method 850 can continue to monitor and update a quality of BT channels 850-12.

In the TD mode, the parallel mode AFH set can be compared to a minimum value 850-13. A minimum value can be the same or different than the one used in 850-3. In some embodiments, a minimum value can be 20 BT available channels (or 10 available BLE channels). Further, such an action can include some hysteresis. If a parallel mode AFH exceeds the limit (Y from 850-13), a method 850 can return to the parallel mode 850-4. If a parallel mode AFH is below the limit (N from 850-13), a device can continue TD operations 850-8.

Figure 9:
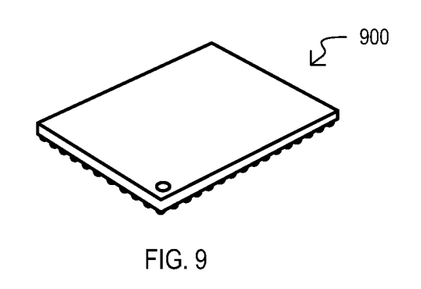
FIG. 9 is a diagram of a combination device according to an embodiment.

While device embodiments can take any suitable form, some embodiments can be advantageously compact single integrated circuits (i.e., chips). FIG. 9 shows a packaged single chip combination device 900 according such an embodiment. However, it is understood that a combination device can include any other suitable integrated circuit packaging type, as well as direct bonding of a combination device chip onto a circuit board or substrate. A combination device 900 can include first and second communication circuits that can share a band, and dynamically switch between a parallel mode and a TD mode, as described herein, or equivalents.

Figure 10A:
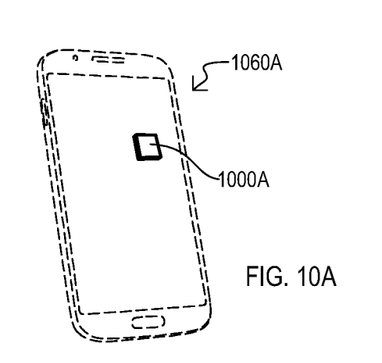
FIGS. 10A to 10D are diagrams of systems according to other embodiments.

Referring to FIGS. 10A to 10D, various other systems according to embodiments are shown in a series of diagrams. FIG. 10A shows a handheld computing device 1060A. Handheld computing device 1060A can include a combination device 1000A that can provide connectivity via two different protocols that operate in a same band and can dynamically switch between parallel and TD modes of operation as described herein or equivalents.

Figure 10B:
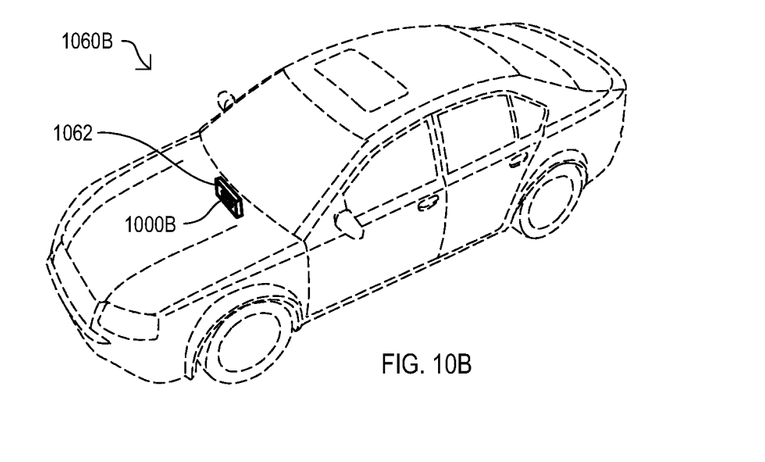

FIG. 10B shows an automobile 1060B according to an embodiment. Automobile 1060B can have numerous subsystems, including a communication subsystem 1062. In some embodiments, a communication subsystem 1062 can enable an automobile to provide WiFi communications (WLAN) as well as enable other devices to pair to the system via Bluetooth. Communication subsystem 1062 can include a combination device 1000B as described herein, or equivalents, serving as an access point, or part of an access point. In such an arrangement, combination device 1000B can provide greater reliability for Bluetooth communications by dynamically switching to a TD mode when BT channels available for AFH operations fall below a threshold.

Figure 10C:
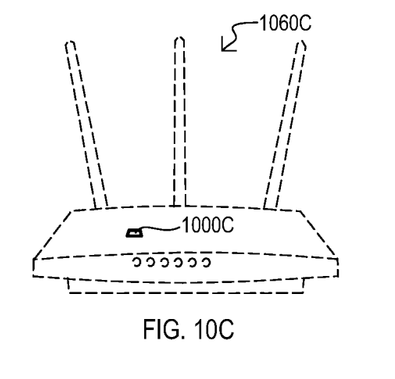

FIG. 10C shows a router device 1060C. Router device 1060C can provide routing functions according to an IEEE 802.11 wireless protocol, while also enabling access via a closer range protocol (e.g., Bluetooth). Router device 1060C can include a combination device 1000C as described herein, or equivalents.

Figure 10D:
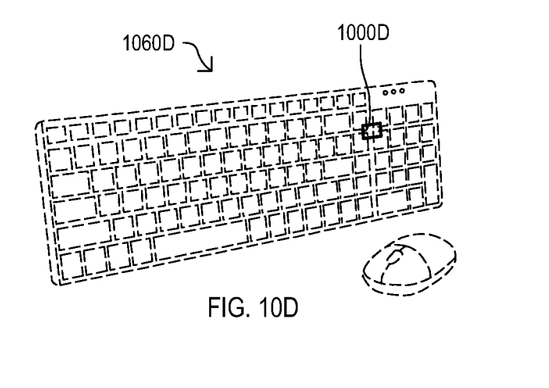

FIG. 10D shows a human interface device (HID) 1060D. HID 1060D can enable a person to interact or control other devices and should not be construed as limited to any particular HID. As but a few of many possible examples, HID 1060D can control a computing system, manufacturing equipment or other systems. HID 1060D can include a combination device 1000D as described herein, or equivalents.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method, comprising:
selecting a plurality of first wireless channels that do not overlap with a second wireless channel;
generating a number corresponding to selected wireless channels having a transmission quality above a quality level, the number excluding channels that overlap the second wireless channel;
if the number is above a first limit, operating in a parallel mode of operation that includes:
wirelessly communicating according to a first protocol by hopping between the selected first wireless channels while excluding first wireless channels that overlap the second wireless channel, the first protocol including a maximum number of first wireless channels and the first limit being no less than 30% of the maximum number of first wireless channels; and
wirelessly communicating according to a second protocol across the second wireless channel; and
if the number is below a second limit, switching to a time division (TD) mode of operation that includes
in first TD time slots, wirelessly communicating according to the first protocol by hopping between first wireless channels that include the selected first wireless channels and first wireless channels that overlap the second wireless channel, and not communicating according to the second protocol; and
in second TD time slots, wirelessly communicating according to the second protocol and not the first protocol.

2. The method of claim 1, wherein:
the first protocol is compatible with a Bluetooth standard; and
the second protocol is compatible with an IEEE 802.11 wireless standard operating in the 2.4 GHz band.

3. The method of claim 1, further including:
generating a multi-bit value representing the number, wherein different permutations of the multi-bit value represent different ranges of the number.

4. The method of claim 3, wherein:
the maximum number of first wireless channels is no less than twenty; and
the multi-bit value has no more than eight bits.

5. The method of claim 1, wherein generating the number includes sampling a quality value for at least the selected first wireless channels a plurality of times before switching between the parallel mode and the TD mode.

6. The method of claim 1, wherein:
wirelessly communicating according to the first protocol is by operation of first communication circuits of an integrated circuit device; and
wirelessly communicating according to the second protocol is by operation of second communication circuits of the same integrated circuit device.

7. A device, comprising:
first communication circuits configured to
in a parallel mode, select non-overlapping first wireless channels that do not overlap with a second wireless channel, and wirelessly communicate according to a first protocol by hopping between the non-overlapping first wireless channels while excluding from the hopping overlapping first wireless channels that overlap the second wireless channel; and
in a time division (TD) mode, wirelessly communicate according to the first protocol by hopping between at least the overlapping first wireless channels in first time slots and not transmitting in the overlapping first wireless channels in second time slots; and
second communication circuits configured to
in the parallel mode, wirelessly communicate according to a second protocol across the second wireless channel; and
in the TD mode, wirelessly communicate according to the second protocol across the second wireless channel in second time slots and not transmit in the second wireless channel in the first time slots;
quality circuits configured to monitor a quality of each of the non-overlapping first wireless channels; and
control circuits configured to
switch from the parallel mode to the TD mode in response to the quality of the non-overlapping first wireless channels falling below a first predetermined limit and without regard to a quality of the overlapping first wireless channels, and
switch from the TD mode to the parallel mode in response to the quality of a number of non-overlapping first wireless channels being above a second predetermined limit; wherein
the first protocol includes a maximum number of first wireless channels and the number is no less than 30% of the maximum number of first wireless channels.

8. The device of claim 7, wherein the first communication circuits communicate according to at least one Bluetooth standard.

9. The device of claim 7, wherein the second communication circuits communicate according to at least one IEEE 802.11 wireless standard.

10. The device of claim 7, further including:
first radio circuits compatible with at least one Bluetooth standard configured to drive an antenna system at the selected first wireless channels;

second radio circuits compatible with at least one IEEE 802.11 wireless standard operating in at least the 2.4 GHz band and configured to drive the antenna system across at least the second channel.

11. The device of claim 7, wherein the first communication circuits and second communication circuits are part of a same integrated circuit device.

12. A system, comprising:
a first wireless device that includes
first communication circuits configured to frequency hop between a first set of first wireless channels in a parallel mode and between a second set of first wireless channels in a time division multiplex (TD) mode according to a first protocol; and
second communication circuits configured to transmit over a second wireless channel in the parallel and TD modes; wherein
the first set of first wireless channels does not include first wireless channels that overlap with the second wireless channel;
the second set of first wireless channels includes first wireless channels that overlap with the second wireless channel; and
in the TD mode, the first communication circuits communicate in first time slots and not second time slots, and the second communication circuits communicate in second time slots but not first time slots; and
control circuits configured to
switch the first wireless device from the parallel mode to the TD mode in response to a transmission quality of the first set of first wireless channels falling below a first limit for a first predetermined duration and without regard to a transmission quality of the second set of first wireless channels; and
switch the first wireless device from the TD mode to the parallel mode in response to a quality of a number of first wireless channels of the second set rising above a second limit for a second predetermined duration; wherein
the first protocol includes a maximum number of first wireless channels and the number is no less than 30% of the maximum number of first wireless channels.

13. The system of claim 12, wherein:
the first communication circuits are compatible with at least one Bluetooth standard; and
the second communication circuits are compatible with at least one IEEE 802.11 wireless standard operating in at least the 2.4 GHz band.

14. The system of claim 12, further including:
the first communication circuits further include at least one first power amplifier (PA) and at least one second low noise amplifier (LNA);
the second communication circuits further include at least one second PA and at least one second LNA; and
an antenna system coupled to the first and second PAs and first and second LNAs.

15. The system of claim 12, wherein:
the second wireless channel is selected from a plurality of band channels of a first band; and
each of the band channels overlaps at least a portion of a first wireless channel range that includes the first and second sets of first wireless channels.

16. The system of claim 15, wherein the second communication circuits are further configurable to communicate over channels of a second band, wherein the second band does not overlap the first band.

* * * * *